United States Patent [19]
Rood

[11] Patent Number: 6,102,355
[45] Date of Patent: Aug. 15, 2000

[54] MOTION IMPARTING SUPPORT FOR CRT MONITORS AND SIMILAR DEVICES

[76] Inventor: Richard K. Rood, 6226 Sandhill, Las Vegas, Nev. 89120

[21] Appl. No.: 09/049,174

[22] Filed: Mar. 27, 1998

[51] Int. Cl.[7] .................................................. F16M 11/38
[52] U.S. Cl. ......................... 248/425; 248/131; 248/920; 248/923; 108/147; 74/27; 414/590
[58] Field of Search ...................................... 248/920, 425, 248/131, 132, 138, 923; 74/89, 5, 110, 521, 25, 26, 27; 108/141, 20, 147, 32; 414/590

[56] References Cited

U.S. PATENT DOCUMENTS

| | | | |
|---|---|---|---|
| 4,561,619 | 12/1985 | Robillard et al. | 248/285 |
| 4,575,033 | 3/1986 | Henneberg et al. | 248/185 |
| 4,669,948 | 6/1992 | Moller | 414/744 |
| 4,726,240 | 2/1988 | Brems | 74/27 |
| 5,078,021 | 1/1992 | Freywiss | 74/479 |
| 5,113,224 | 5/1992 | Tsuda et al. | 355/234 |
| 5,285,992 | 2/1994 | Brown | 248/421 |
| 5,683,068 | 11/1997 | Chase et al. | 248/371 |
| 5,698,959 | 12/1997 | Yamagisawa | 318/568.11 |
| 5,702,084 | 12/1997 | Carnahan et al. | 248/416 |

*Primary Examiner*—Ramon O. Ramirez
*Assistant Examiner*—Walter Landry
*Attorney, Agent, or Firm*—Gregory J. Nelson

[57] ABSTRACT

A support device for imparting repetitive motion to items such as a computer monitor. The device has a support base connected to drive means which impart either a reciprocal, an up-and-down or both motions to the support to induce relief and therapy to those who are required to focus on the device for extended periods of time.

14 Claims, 4 Drawing Sheets

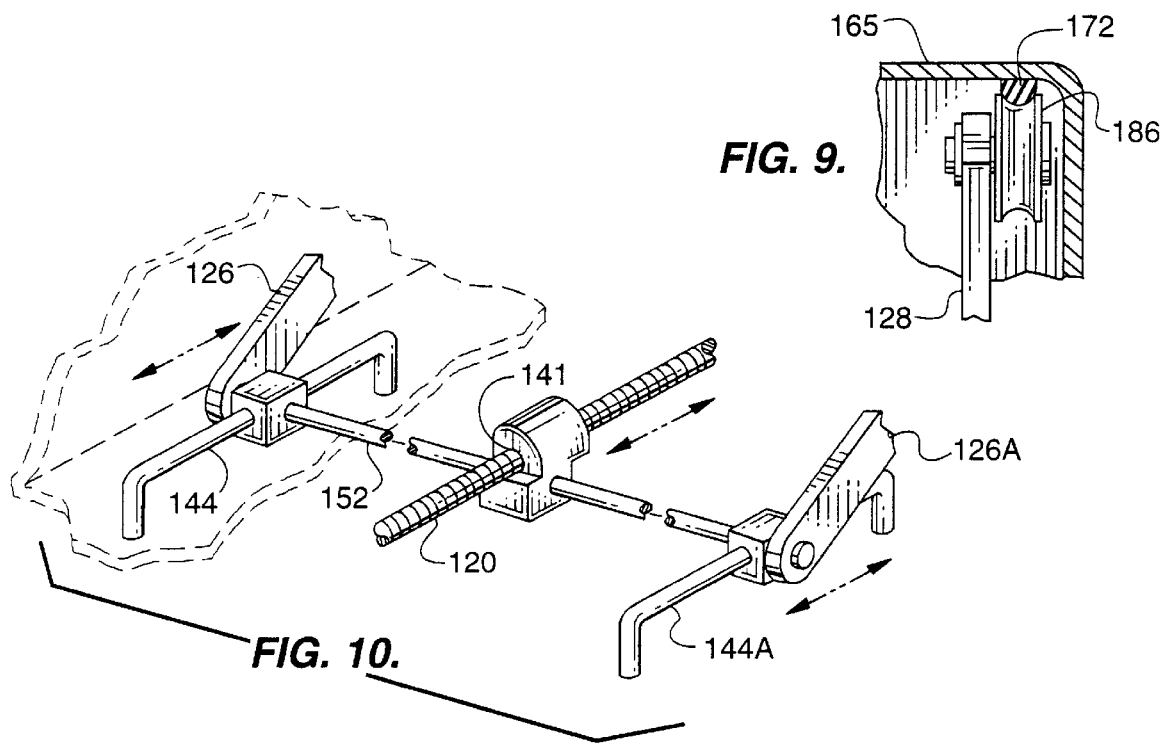
FIG. 9.
FIG. 10.
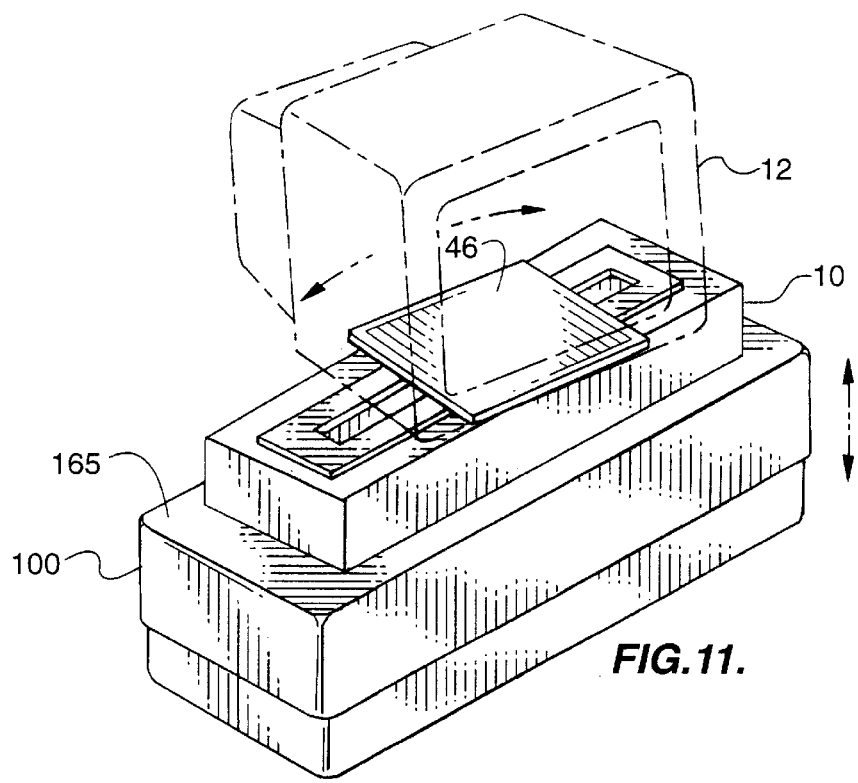
FIG. 11.

MOTION IMPARTING SUPPORT FOR CRT MONITORS AND SIMILAR DEVICES

FIELD OF THE INVENTION

The present invention relates to an equipment base or support and more particularly relates to a support for CRT monitors and similar equipment which support relieves stress on personnel induced by equipment of this type which requires that the user visually focus on a certain location such as a monitor for extended periods of time.

BACKGROUND OF THE INVENTION

Computer systems are in wide use both for personal and business applications. Computer systems generally include a keyboard, a processing unit and a monitor which displays information on a screen. Use of the computer requires that the computer operator or user sit for extended periods of time entering information and commands via the keyboard. Information is displayed on the monitor. It is known that repetitive motions such as use of the keyboard for prolonged periods can cause discomfort and even develop into serious conditions such as rheumatoid arthritis. A condition known as carpal tunnel syndrome is a common painful disorder of the wrist and hand induced by compression on the median nerve between the inelastic carpal ligament and other structures within the carpal tunnel. The syndrome is often present in individuals who operate keyboard equipment for long periods of time.

In addition to the well-known carpal tunnel syndrome, frequent users of equipment such as computer systems often suffer from cervical pain and discomfort. In contrast to repetitive motion induced conditions, this is generally a result of the user maintaining a fixed head position while focusing on the computers monitor for extended time periods. The result is that computer users often suffer from painful chronic neck and shoulder stiffness and headaches.

In view of the foregoing, there exists a substantial need for a device that will provide both relief and therapy to those who are required to maintain focused or concentrated for extended time periods on equipment such as CRT monitors. Although the present invention is described with reference to use and application in computer systems, it will be obvious that the motion imparting support of the present invention can be applied to other types of devices and equipment.

The support of the present invention induces continual motion therapy to the user in the work place. This is accomplished by a support which moves the equipment intermittently from side to side as well as up and down. This movement causes the user to turn his or her head and such movement is believed to aid in the prevention of different types of cervical or repetitive strain problems.

While the prior art is replete with a number of pedestals and bases for CRT type displays, none provide the therapeutic reciprocal side-to-side and up-and-down motion of the present device. Reference is made to the following patents: U.S. Pat. Nos. 4,561,619; 4,575,033; 4,687,167; 4,836,478; 5,134,390; and U.S. Pat. No. 5,342,005.

SUMMARY OF THE INVENTION

Briefly, the present invention provides a support for a computer monitor or device which support has two components. The first component supports the CRT monitor and imparts continual side-to-side motion or movement to the monitor. The base of the first component has a housing which contains a reversible drive unit which through a motion translating mechanism reciprocally and rotatively moves a pedestal within the housing. The pedestal carries a base plate on which the monitor or other equipment is supported. As the base plate is driven from side to side, it rotates slightly to maintain the monitor screen in full view of the user. The reciprocal or side-to-side motion of the monitor requires the user to slowly rotate his or her neck from side to side which continued physical movement is believed to help to relieve muscle soreness and fatigue. The forced movements "exercise" the user's neck area helping to avoid cervical problems which often result from maintenance of the head in a fixed position for extended periods of time.

In the preferred embodiment, the motion translating mechanism is a lead screw which drives a follower in a reciprocal, arcuate path. The follower is attached to a pedestal which supports and moves the base so the monitor maintains proper orientation for viewing by the user.

The second component or unit has a housing with a platform or support surface which through a scissors linkage is driven up and down. The first and second components may be used by themselves or in conjunction with the other unit in which case both an up-and-down and a side-to-side motion are imparted to the supported piece of equipment.

BRIEF DESCRIPTION OF THE DRAWINGS

The above and other objects and advantages of the present invention will become more apparent from the following description, claims and drawings in which:

FIG. 9 is a sectional view of the bearing arrangement taken along line 9—9 of FIG. 7;

FIG. 10 is a partial perspective view of a motion translation mechanism of the support shown in FIGS. 5 to 8; and FIG. 11 is a perspective view showing the first support shown in FIGS. 1 through 5 and the support shown in FIGS. 6 to 10 both being used in conjunction with a single CRT to impart both transverse and vertical motion to the CRT.

Figure 1:
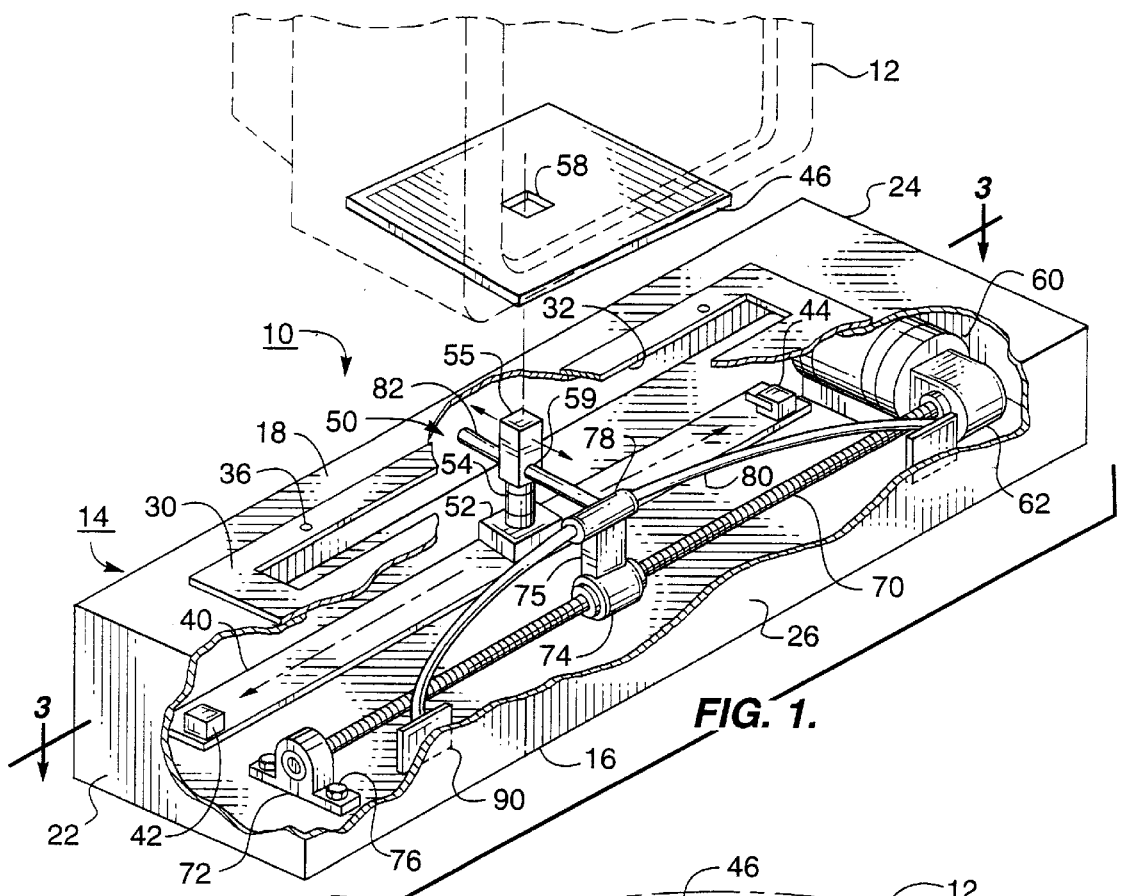
FIG. 1 is a perspective view, partly broken away, illustrating the components of the support device of the present invention which reciprocally supports a representative piece of equipment such as a computer monitor which monitor is show in phantom lines.

Turning now to the drawings, a first embodiment of the support of the present invention is shown in FIGS. 1 to 4 and is generally designated by the numeral 10 and is shown in conjunction with a computer monitor 12 which, as indicated above, is representative of the type of equipment with which the support may be used. The monitor 12 itself forms no part of the present invention and is shown as being representative to facilitate understanding of the invention and its environment of use.

The motion translating and imparting support 10 includes a housing 14 which is shown as being generally rectangular having generally planar bottom surface 16 and upper surface 18, rear wall 20, opposite side walls 22 and 24 and front wall 26. The upper surface 18 of housing 10 is provided with an opening which is defined by a transversely extending slot 32 in frame 30. Frame 30 is a suitable wear-resistant, low-friction material as it serves as a guide for the movement of the pedestal as will be explained below. The frame 30 may be secured to the housing surface 18 by any convenient means such as a plurality of screws 36 as shown. The housing 14 may be metal or a suitable plastic such as ABS.

Figure 4:
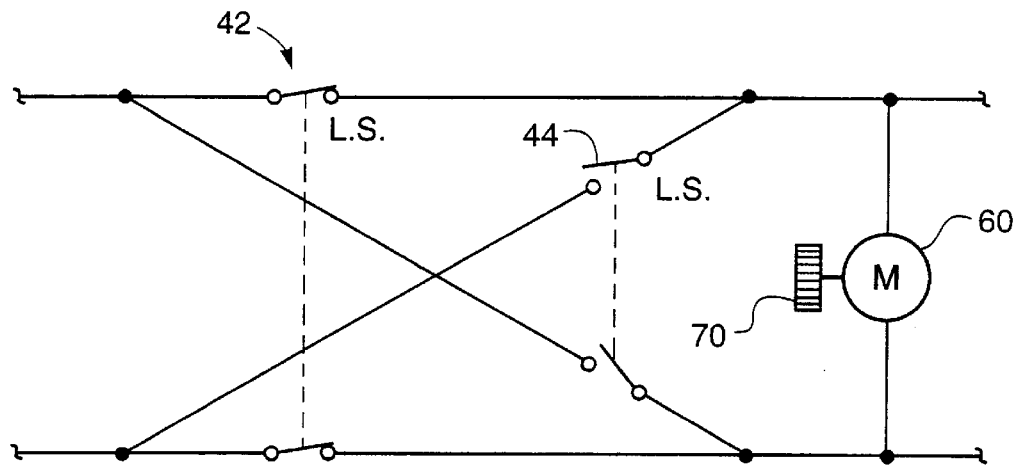
FIG. 4 is a schematic diagram of the electrical circuit.
Figure 5:
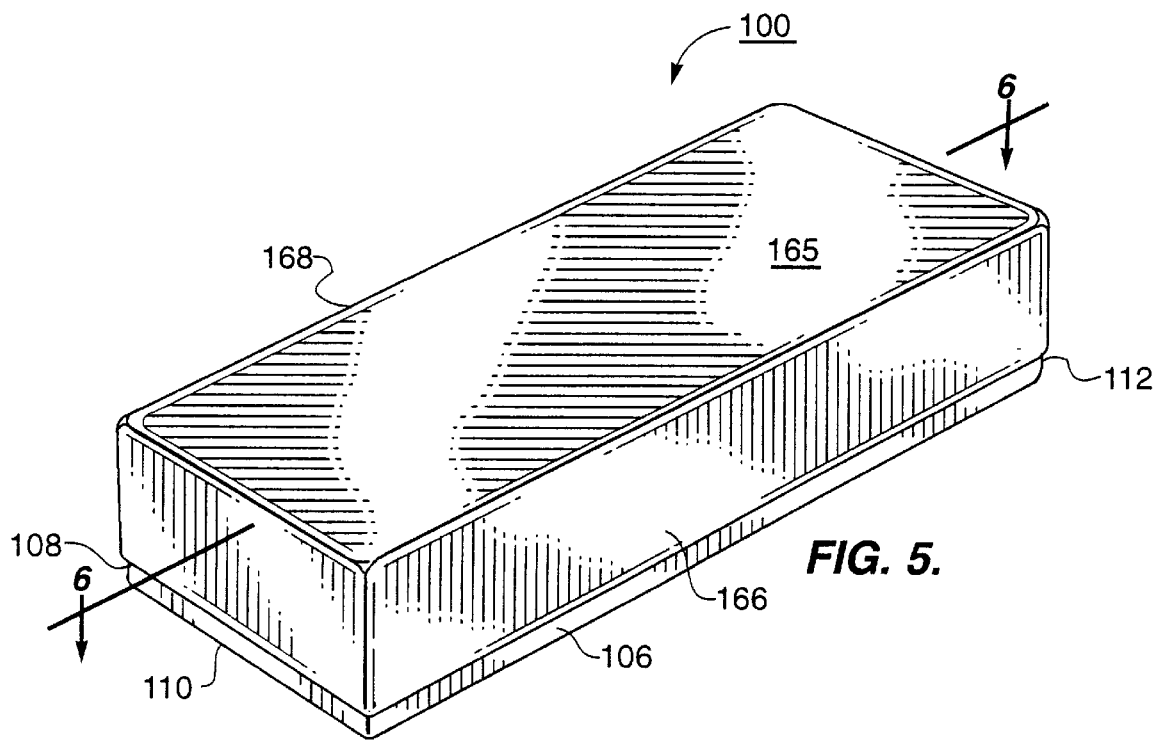
FIG. 5. is a perspective view of the second support component of the motion monitor according to the present invention which is adapted to impart a vertical reciprocating motion to a device such as a CRT.

A generally elongate planar track 40 extends along the interior of the bottom surface 16 disposed directly below the slot 32. The track may be a suitable bearing or wear-resistant material such as a bronze or steel strip. Limit switches 42, 44 are positioned adjacent the opposite ends of the track 40 and, as seen in FIG. 4, operate to control the direction of operation of the drive motor 60.

The monitor 12 is supported on a generally planar base 46 which is supported parallel to and above the upper surface 18 of the housing. The base 46 is supported on a pedestal 50 which has a pad 52 at its lower end which is reciprocally slidable along the track 40. A shaft 54 extends vertically upward from the pad and is fixed to the pad. A generally rectangular cap 55 has a blind bore which is received over the upper end of the shaft 54 so that the cap 55 is rotatable with respect to the fixed shaft 54. The cap projects through guide slot 32 and is reciprocally guided by the slot. A bore 59 extends through the cap 55 transversely. The base plate 46 is secured to the upper end of the cap portion of the pedestal or stand at rectangular aperture 58.

The support 10 includes a drive system having a reversible motor 60 which is mounted in the housing adjacent housing end wall 24. The motor drives a gear box 62 having an output shaft which is in driving connection with a lead screw 70 having a threaded exterior surface. The lead screw is positioned in parallel arrangement with front wall 14 and is interposed between the front wall and the track 40. The distal end of the lead screw is receivable in a bearing block 72 which is secured to the bottom wall of the housing by screws 76. Thus, the gear motor reversibly drives the lead screw at a predetermined rotational rate.

Figure 3:
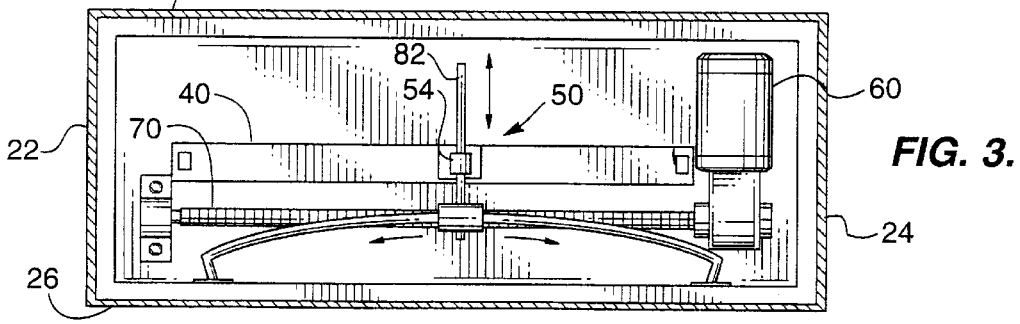
FIG. 3 is a sectional view taken along line 3—3 of FIG. 1.

The drive mechanism further includes a motion translation device which translates the rotation of the lead screw to a reciprocal and rotative movement of the base 46. The motion translation device includes follower 74 which is internally threaded and in engagement with the lead screw 70. The follower includes a vertical bar section 75 which carries a slide 78 which is generally cylindrical and which is slidable along curved guide rod 80. The slide 78 carries connecting rod 82 which extends through the bore 59 in the upper end of the pedestal. The rod is freely slidable within the bore 59. Guide rod 80 is forwardly curved as seen in FIGS. 1 and 3 and is attached at its opposite ends to pads 90 secured to the front wall 26 of the housing.

It will be apparent that as the follower 74 traverses the lead screw, slide 78 will follow on rod 80. Connecting rod 78 also moves reciprocally and, as it moves, will cause the pedestal 50 to slide along track 40. Since rod 80 is curved, the slide 78 will move, not only reciprocally, but will move forward and away from the front wall 20 as it moves in an arcuate path. This, in turn, will cause a rotation to be imparted to the cap 50 and the base 46.

Figure 2:
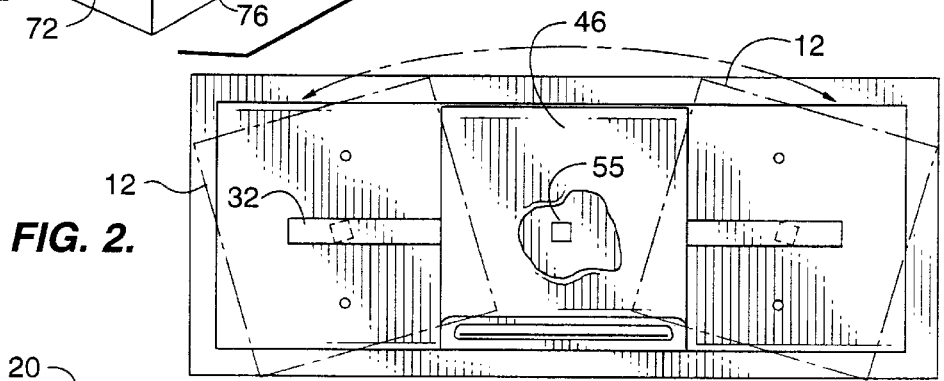
FIG. 2 is a top view of the support shown in FIG. 1 with the path of travel of the supported equipment being indicated in phantom lines.

As best seen in FIG. 2, the base 46 will rotate slightly counterclockwise as the pedestal is moved leftwardly. As the pedestal moves rightwardly a slightly counterclockwise rotary motion will be imparted to the cap 54 and base plate 46. As represented by the phantom lines in FIG. 2, it will be seen that the base plate 46 will, as it reciprocates, assume a rotational and tracking movement which insures that the monitor is at the proper viewing angle for the user viewing the monitor supported on the base plate.

In use, the support is positioned with the monitor 12 supported on the base plate 46 and drive motor 60 connected to an electrical source. The drive motor may be an ac motor or a dc motor in which case ac current would be converted to dc. With the drive motor engaged, the lead screw 70 will slowly rotate causing the follower to reciprocate along its track. As the follower reciprocates, the base and the support is caused to reciprocate and rotate as described above. For most applications, the length of the path of travel will be about _____" to _____" and the rate of travel will be about _____ to _____ ipm. When the base reaches a predetermined point, as for example the left end of track 40 as seen in FIG. 1, limit switch 42 will be energized which will cause the polarity of the motor 60 to be reversed. Upon reversal of the motor, the follower and the pedestal will be reversed and caused to move rightwardly until limit switch 44 is engaged at which time the direction of travel will again be reversed. The repetitive movement continues and will result in the operator having to slowly rotate his or her neck to maintain focus on the monitor. This movement is believed to alleviate cervical problems.

The support described in FIGS. 1 to 5 imparts a horizontal, reciprocal motion to the monitor coupled with a rotational motion about a vertical axis. FIGS. 5 through 10 show an alternate or second embodiment of the present invention which is generally designated by the numeral 100 and which support imparts vertical up-and-down or reciprocal motion to supported objects. As will be set forth in greater detail hereafter, the support of embodiment 10 and of embodiment 100 may be used in conjunction with one another to support a device such as a CRT for bi-axial movement. The support 100 has a lower fixed housing 102 which has a bottom wall 104 and upstanding side walls 106 and 108 and end walls 110 and 112. A motor 116 reversibly drives a lead screw 120 which extends axially within the housing at a location intermediate to and parallel to the side walls 106, 108. The distal end of the lead screw is received in a bearing member 118 at wall 112.

The lead screw drives a scissor linkage 125 which consists of a first pair of arms 126, 128 pivotally connected to axle 130. A second pair of similar arms 126A and 128A are pivotally connected to axle 130. The lower ends of arms 128 and 128A are pivotally connected to pivot points 134 and 134A, respectively. The lower or bottom ends of arms 126 and 126A terminate at a bearing block 140 and 140A, respectively. The bearing blocks 140 and 140A each define an axially extending bore 141 which is slidable along guide members 144 and 144A secured to the bottom 104 of the base and extending parallel to the front and rear walls. A traveler 150 is in threaded engagement with the lead screw and is attached to a cross member 152 which, in turn, is connected to the blocks 140 and 140A at its opposite ends.

The support 100 further includes an upper housing member 160 which is a generally rectangular or box-like structure having end walls 162 and 164, side walls 166 and 168 which overlap the end walls and side walls of the bottom housing portion and are vertically slidable relative to the bottom housing. Top wall 165 provides the support surface.

As seen in FIG. 9, bearing pads 170 and 172 are provided on the interior of the top wall 174 of the upper housing member. The bearing pads may be any suitable material such as a low-friction plastic such as that sold under the trademark "Delrin".

The upper end of arms 126 and 126A each carry a roller 180 and 180A, respectively, which are in engagement with bearing members 170. Similarly, rollers 186 and 186A located on the upper ends of arms 128 and 128A are in engagement with bearing surfaces 172.

Figure 6:
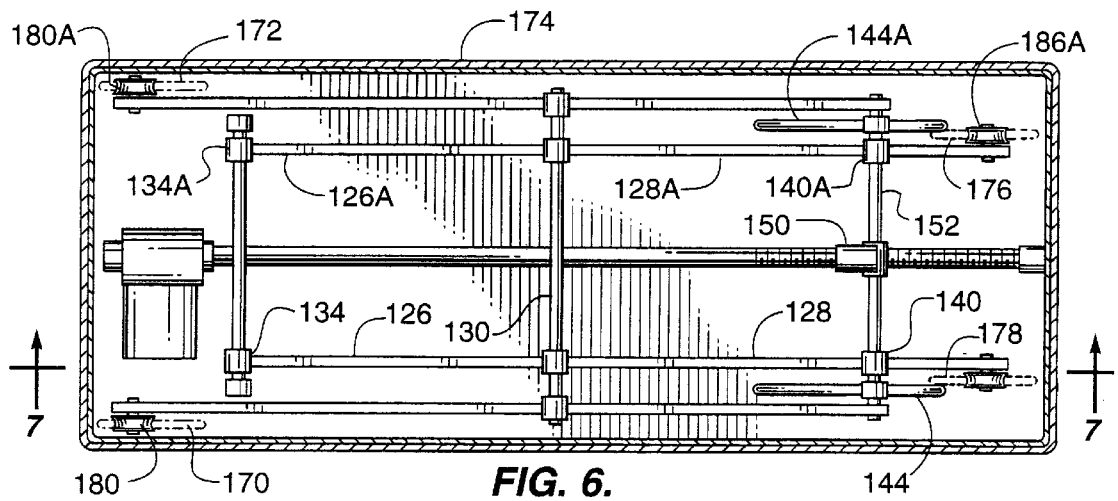
FIG. 6 is a sectional view taken along line 6—6 of FIG. 5.
Figure 7:
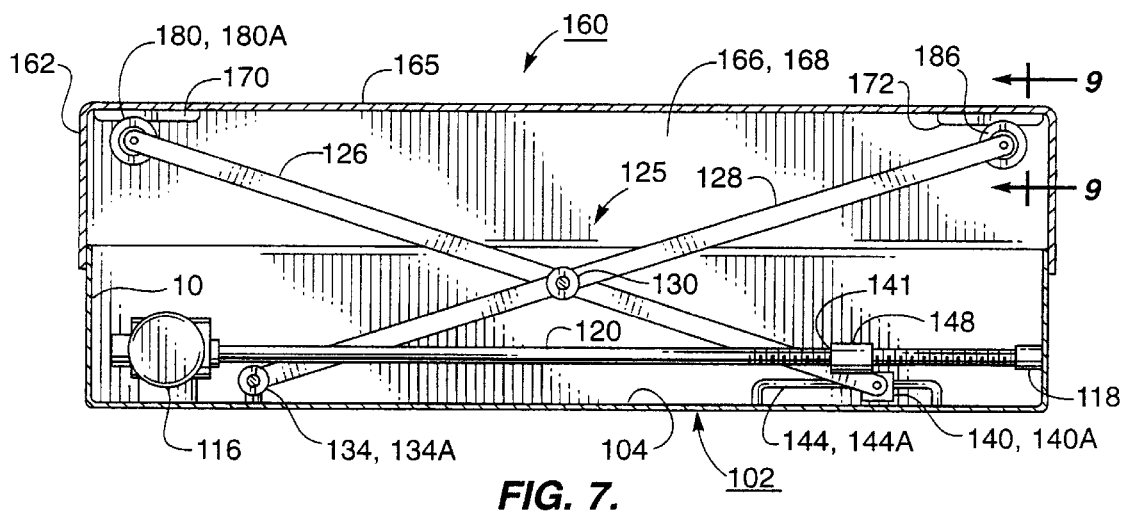
FIG. 7 is a sectional view taken along 7—7 of FIG. 6 showing the support in an elevated or raised position.
Figure 8:
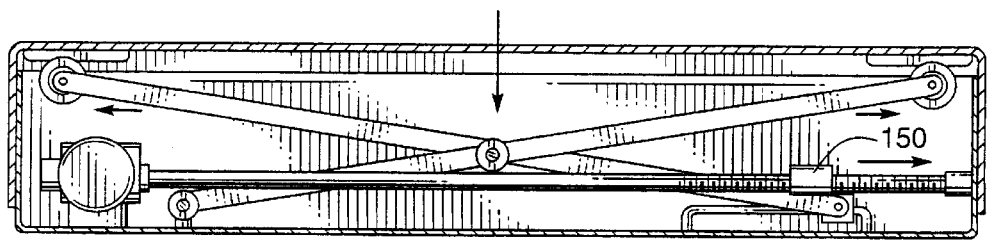
FIG. 8 is a sectional view similar to FIG. 7 showing the motion monitor of the embodiment in a lowered position.

In operation, it will be seen that as motor 116 operates lead screw 120 in one rotational direction, the traveler 150 will move rightwardly as viewed in FIGS. 6 through 8. The rightward movement of traveler 150 will cause the bearing block member 140, 148A to move rightwardly causing the scissor linkage 125 to collapse or descend until the position is reached in FIG. 8 in which the support is fully descended. Operation of the motor 116 in the opposite rotational direction will cause the traveler 150 to move leftwardly causing the upper support surface to elevate. The reversal of the motor is accomplished by internal motor circuitry or by use of limit switches as is well known.

Placement of an object such as a CRT on the upper wall 165 of the support will, when the support is actuated, cause the object to be repeatedly moved in a vertical up and down motion, the rate of which is dependent upon the rate of operation of the motor. In most applications, the speed of operation is selected so that it is not noticeable or perceptible but will result in the user over a period of time having to move the user's head up and down exercising the cervical area and therefore avoiding medical complications that can arise from maintaining the head in the same of fixed position over a prolonged period.

The first embodiment 10 and the second embodiment 100 may be used independently in conjunction with one another as shown in FIG. 11. As shown in FIG. 11, support 100 is placed on a supporting surface such as a work station desk top. Support 10 is then positioned on the upper supporting surface 165 of the support 100 with a computer monitor 12 positioned on the platform 46 of support 10. When both the units 10 and 100 are actuated, the support 100 will move the supporting surface 165 upwardly and downwardly. Concurrently, support 10 will impart a horizontally reciprocal motion as well as a rotational motion to the platform 46. Thus, the user will continually have to change or adjust the position of the user's head both vertically and horizontally during work periods to alleviate or prevent muscle soreness and fatigue which often occur from maintaining the head in a fixed position for extended periods of time.

As mentioned above, the device of the present invention is intended for use with devices such as monitors for computer systems but may be applied to any number of applications in which it would be beneficial that an item of equipment reciprocate or move to cause the user to rotate his or her neck to prevent cervical and repetitive strain problems.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. An apparatus for supporting a monitor which is viewed by the user as it is used comprising:

(a) a support for receiving and supporting the equipment in view of the user;

(b) drive means;

(c) motion translating means continously interconnecting said drive means and said support, said motion translating means including means for moving said support in a generally horizontal reciprocal path whereby the user is required to rotate his or her head slightly to maintain viewing of the equipment thereby providing therapy for possible soreness and fatigue.

2. The apparatus of claim 1 wherein said motion translating means include a lead screw driven by said drive means, a follower on said lead screw, guide means moveable along an arcuate path and means connecting said guide means to said support.

3. The apparatus of claim 1 wherein said path is a generally horizontal arcuate path to maintain said equipment in a viewing position.

4. The apparatus of claim 1 wherein said path includes a generally vertical up and down motion.

5. The apparatus of claim 1 wherein said path is simultaneously generally vertical and horizontal.

6. An apparatus for supporting a computer monitor and moving it in a reciprocal arcuate path, said apparatus comprising:

(a) a support for the monitor including a pedestal and base for supporting the monitor in a viewing position;

(b) a drive having an output connected to a lead screw;

(c) a follower in threaded engagement with said lead screw and reciprocal along said lead screw as said lead screw is rotated;

(d) guide means driven by said follower and having slide means moveable in an arcuate path; and (e) connecting means connecting said guide means to said pedestal whereby upon rotation of said lead screw, a reciprocal, arcuate motion is imparted to said guide means which is, in turn, transmitted to said pedestal to impart a reciprocal arcuate motion to said support and the monitor thereon.

7. The apparatus of claim 6 wherein said pedestal includes a pad slidable along a track generally parallel to said lead screw, an upstanding shaft on said pad and a rotatable cap on said shaft, said cap having a transverse bore and wherein said connecting means comprises a rod extending between said guide means and said transverse bore and wherein said rod is slidable within said transverse bore.

8. The apparatus of claim 7 further including electrical switch means positioned to be engaged to cause said drive motor to reverse direction of operation.

9. The apparatus of claim 7 further including a housing with a guide slot therein and wherein said pedestal engages said guide slot.

10. An apparatus for supporting a computer monitor and moving it in a reciprocal vertical path, said apparatus comprising:

(a) a support surface for the monitor for supporting the monitor in a viewing position;

(b) a fixed base;

(c) a drive having an output connected to a rotatable member;

(d) a traveler reciprocable along a rotatable member as said rotatable member is rotated; and (e) motion translating means interconnected to said traveler and said support surface whereby upon rotation of said rotatable member, a generally simultaneous reciprocal and vertical motion is imparted to the monitor supported on said surface to provide therapy to the user.

11. An apparatus for supporting a computer monitor and moving it in a predetermined motion comprising:
  (a) a first motion imparting means having an support surface and having motion translating means for driving said support surface in a generally reciprocal horizontal path of travel; and
  (b) second motion imparting means having a second support surface for driving said second surface in a generally up and down reciprocating path whereby said first and second motion imparting means may be positioned with one of said motion imparting means on the support surface of the other whereby the monitor is continually and simultaneously driven in both a horizontal and vertical motion path to provide therapy to the user.

12. A method of alleviating neck strain by a user when using a computer monitor comprising:
  (a) providing a motion translating device having a support surface in a view position relative to the user;
  (b) placing the monitor on said surface in convenient view of the user;
  (c) operating said motion translating device to impart a continuous reciprocal motion to said support surface thereby causing said user to continually move the user's head to maintain viewing resulting in a forced therapeutic motion.

13. Method of claim 12 when said reciprocal motion includes an arcuate component.

14. Said method of claim 12 when reciprocal motion includes an up and down component.

* * * * *